United States Patent [19]
Pessolano et al.

[11] 3,853,896

[45] Dec. 10, 1974

[54] CERTAIN DILIOWERALKYLAMINO-METHYLENE(OR ETHYLENE)-2(IH)PYRIDONES

[75] Inventors: Arsenio A. Pessolano, Colonia; Bruce E. Witzel, Westfield; Patricia M. Graham, Mountainside; Robert L. Clark, Woodbridge; Tsung-Ying Shen, Westfield, all of N.J.

[73] Assignee: Merck & Co., Rahway, N.J.

[22] Filed: June 25, 1971

[21] Appl. No.: 156,919

[52] U.S. Cl. ... 260/296 R, 260/283 S, 260/283 CN, 260/287 R, 260/288 R, 260/294.8 F, 260/294.8 G, 260/294.9, 260/295 R, 260/297 Z, 260/293.69, 424/258, 424/263, 424/267

[51] Int. Cl............................................ C07d 31/42

[58] Field of Search ............................. 260/296 R

[56] References Cited

UNITED STATES PATENTS 3,721,676   3/1973   Witzel et al.......................... 260/296

Primary Examiner—Alan L. Rotman
Attorney, Agent, or Firm—Harry E. Westlake, Jr.; Manfred Polk

[57] ABSTRACT

Novel process for preparing pyridones via a nucleophilic substitution side chain reaction of halopyridones. The novel pyridones disclosed herein are potent anti-inflammatory, analgesic and anti-pyretic agents. Also included are pharmaceutical compositions containing said pyridones as active ingredients and the methods of treating painful, inflamed and fever states in patients by administering said compounds.

9 Claims, No Drawings

CERTAIN DILIOWERALKYLAMINO-METHYLENE(OR ETHYLENE)-2(IH)PYRIDONES

This invention relates to a novel process for preparing pyridones and derivatives thereof via a nucleophilic substitution side chain reaction of substituted-halopyridone type nucleus compounds. More specifically, the invention relates to a novel nucleophilic substitution side chain reaction of 4- or 6-alkyl or aralkyl-3- or 5-halo-2[1H]-pyridones, 4- or 6-alkyl or aralkyl-3,5-dihalo-2[1H]-pyridones, 4,6-dialkyl or diaralkyl-3- or 5-halo-2[1H]-pyridones, 4,6-dialkyl or diaralkyl-3,5-dihalo-2[1H]-pyridones, halo-2-oxo-tetrahydropyridines or halotetrahydroquinolone. Also included within the scope of the invention are novel pyridone compounds and pharmaceutical compositions containing said novel pyridone compounds as active ingredients. The novel pyridone compounds of this invention are potent anti-inflammatory, analgesic and anti-pyretic agents which are effective in the method of counteracting inflammation, fever and painful conditions in patients.

In a continued search for potent anti-inflammatory, analgesic and anti-pyretic agents, we have found a novel class of pyridone compounds and derivatives thereof which are highly effective anti-inflammatory, analgesic and anti-pyretic agents.

Also, in a continued search for potent anti-inflammatory, analgesic and anti-pyretic agents, we have found a novel unexpected nucleophilic substitution side chain reaction which can be employed in the preparation of both novel pyridones disclosed herein and known pyridones. For example, when 3-bromo-5-methyl-2[1H]-pyridone is treated with a primary amine (monomethylamine) at elevated temperatures for extended periods of time, there is obtained the expected 3-methylamino-5-methyl-2[1H]-pyridone as shown by equation 1 below:

1)
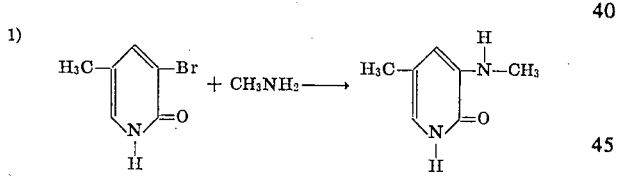

However, when 3-bromo-6-ethyl-5-methyl-2[1H]-pyridone is treated with a primary amine (monomethylamine), the reaction takes an entirely unexpected route and as a result thereof, reaction occurs at the α-carbon at the 6-position of the pyridone nucleus to yield the unexpected 5-methyl-6-[(α-methylamino)ethyl]-2[1H]-pyridone as shown by equation 2 below:

2)
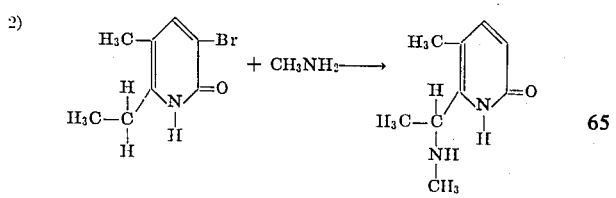

Also, when 3-bromo-5,6,7,8-tetrahydroquinolone is treated with a primary amine (monomethylamine), the novel nucleophilic substitution reaction occurs at the 8-position (α-methylene group) of the tetrahydroquinolone nucleus to yield the unexpected 8-methylamino-5,6,7,8-tetrahydroquinolone as shown by equation 3 below:

3)
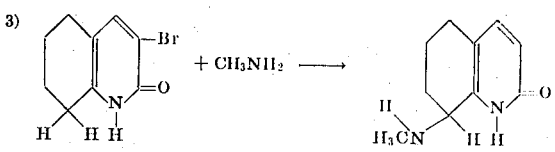

The novel anti-inflammatory, analgesic and antipyretic pyridones and tetrahydroquinolones of the invention are represented by the following structures below:

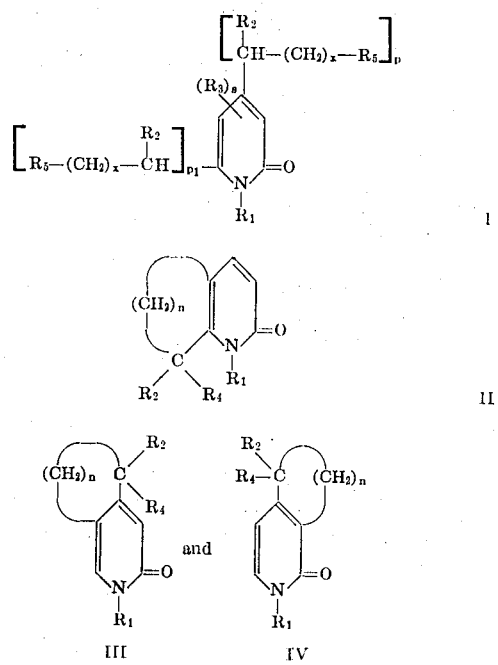

wherein
R₁ is hydrogen;
  alkyl, such as methyl, ethyl, propyl, butyl and the like;
  aryl, such as phenyl, o,m or p-tolyl, o,m or p-methoxyphenyl, o,m or p-halophenyl, o,m or p-hydroxyphenyl, o,m or p-(trifluoromethyl)-phenyl, o,m or p-(dialkylamino)phenyl and the like;
  alkoxyalkyl, such as methoxyethyl, ethoxyethyl, propyloxyethyl and the like;
  aralkyl, such as benzyl, phenethyl, o,m or p-methylbenzyl, o,m or p-methoxybenzyl, o,m or p-methylphenethyl, o,m or p-(trifluoromethyl)-benzyl, o,m or p-halobenzyl, o,m or p-dimethylaminophenethyl and the like;

dialkylaminoalkyl, such as diethylaminoethyl, methylethylaminoethyl, dibutylaminoethyl, dimethylaminoethyl, diethylaminobutyl and the like;
alkenyl, such as allyl, butenyl and the like;
carboxyalkyl, such as carboxymethyl, carboxyethyl, carboxypropyl, carboxybutyl and the like;

$R_2$ is mono- or di-alkylamino, such as methylamino, ethylamino, propylamino, butylamino, diethylamino, methylethylamino, methylpropylamino, dipropylamino, dibutylamino and the like;
mono- or di-aralkylamino, such as phenethylamino, methylphenethylamino, o,m or p-methoxyphenethylamino, benzylamino, benzylmethylamino and the like;
bis-alkanolamino, such as bis-ethanolamino, bis-propanolamino, bis-butanolamino and the like;
hydroxy mono- or di-alkylamino, such as β-hydroxydiethylamino, γ-hydroxydipropylamino, β-hydroxyethylamino, β-hydroxypropylamino and the like;
heterocyclicamino, such as piperidino, morpholino, methylpiperazinyl, pyrrolidino, azepino and the like;
amino;
hydroxy;
alkoxy, such as methoxy, propyloxy, butoxy and the like;
alkylthio, such as methylthio, ethylthio, propylthio, butylthio and the like;
aralkylthio, such as benzylthio, phenethylthio, o,m or p-halobenzylthio and the like;
aryloxy, such as phenoxy, o,m or p-tolyloxy, o,m or p-methoxyphenoxy, o,m or p-trifluoromethylphenoxy, o,m or p-halophenoxy and the like;
aralkyloxy, such as benzyloxy, phenethoxy, o,m or p-tolyloxy, o,m or p-methoxybenzyloxy, o,m or p-halobenzyloxy, o,m or p-methylphenethoxy and the like;
mono- or di-arylamino, such as anilino, o,m or p-toluidino, o,m or p-anisidino, o,m or p-haloanilino and the like;
arylsulfinyloxy, such as phenylsulfinyloxy, o,m or p-methylphenylsulfinyloxy, o,m or p-methoxyphenylsulfinyloxy and the like;
bis(carboalkoxy)methylene, such as bis(carbomethoxy)methylene, bis(carboethoxy)methylene, bis(carbopropyloxy)methylene and the like;
alkylsulfinyloxy, such as methylsulfinyloxy, ethylsulfinyloxy, propylsulfinyloxy and the like;

$R_3$ is alkyl, such as methyl, ethyl, propyl, butyl and the like;
aralkyl, such as benzyl, phenethyl, o,m or p-methylbenzyl, o,m or p-methoxybenzyl, o,m or p-methylphenethyl, o,m or p-halobenzyl, o,m or p-hydroxyphenethyl and the like;
aryl, such as phenyl, o,m or p-tolyl, o,m or p-methoxyphenyl, o,m or p-halophenyl, o,m or p-hydroxyphenyl, o,m or p-halomethylphenyl, and the like;
alkoxy, such as methoxy, ethoxy, propoxy, butoxy and the like;
alkylthio, such as methylthio, ethylthio, propylthio, butylthio and the like;

arylthio, such as phenylthio, o,m or p-methoxyphenylthio, o,m or p-methylphenylthio, o,m or p-halophenylthio and the like;
hydroxy;
cyano;
aryloxy, such as phenoxy, o,m or p-methoxyphenoxy, o,m or p-tolyloxy, mesityloxy and the like;
$R_4$ is hydrogen;
aryl, such as phenyl, o,m or p-tolyl, o,m or p-halophenyl, o,m or p-methoxyphenyl and the like;
alkyl, such as methyl, ethyl, propyl, butyl and the like;
$R_5$ is hydrogen or phenyl;
$s$ is zero or one;
$n$ is an integer ranging from 2–6;
$p$ and $p_1$ are each integers equal to 0 or 1 with at least one ($p$) equal to 1; and
$x$ is an integer ranging from 0–4, with the following provisos:
1. When $R_2$ is hydroxy, aryloxy, methoxy or diethoxymethyl, at least one of $R_1$ and $R_3$ are other than hydrogen.
2. When $R_2$ is hydroxy and $R_3$ is methoxy, $R_1$ is other than hyrogen.
3. When $R_3$ is hydroxy and $R_2$ is piperidino, $R_1$ is other than hydrogen.

The novel anti-inflammatory, analgesic and antipyretic pyridones and tetrahydroquinolones of the invention are prepared by employing a starting material selected from the general structures below:

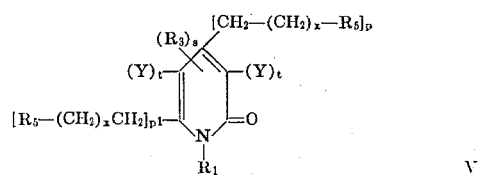

V

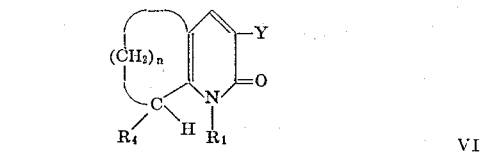

VI

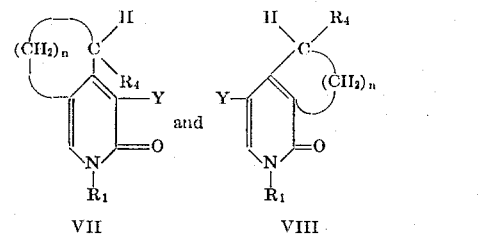

VII    VIII wherein $n, s, p_1, p, x, R_1, R_3, R_4$ and $R_5$ are as previously defined; Y is halogen such as bromine, chlorine, iodine and the like; and t is equal to zero or one with at least one ($t$) being other than zero; with the proviso that at those positions where $p, p_1$ or $t$ are zero, the nucleus can be substituted at such position with an $R_3$ radical selected from the group consisting of alkyl, aralkyl, aryl, alkoxy, alkylthio, arylthio, hydroxy, cyano or aryloxy.

To obtain the novel substituted-2[1H]-pyridones represented by Formula I, 3- or 5-halo-4- or 6-alkyl or aralkyl-$R_3$-substituted-2[1H]-pyridones, 3- or 5-halo-4- and 6-alkyl or aralkyl-$R_3$-substituted-2[1H]-pyridones, 3- and 5-halo-4- or 6-alkyl or aralkyl-$R_3$-substituted-2[1H]-pyridones or 3- and 5-halo-4- and 6-alkyl or aralkyl-$R_3$-substituted-2[1H]-pyridones are treated with a nucleophilic reagent whereby the pyridone nucleus is dehalogenated and the corresponding 4- or 6-[($\alpha$-substituted)-alkyl or aralkyl]-$R_3$-substituted-2[1H]-pyridone or 4- and 6-[($\alpha$-substituted)-alkyl or aralkyl]-2[1H]-pyridone is obtained. For example, to obtain 5-methyl-5-[($\alpha$-dimethylamino)ethyl]-2[1H]-pyridone, 3-halo-6-ethyl-5-methyl-2[1H]-pyridone is treated with dimethylamine. One skilled in the art will readily appreciate that in addition to the mono-nucleophilic substitution side chain reaction above, the equivalent bis-nucleophilic substituted compounds of Formula I are obtained by treating 3,5-di-halo-4,6-di-(alkyl or aralkyl)-2[1H]-pyridone with a nucleophilic reagent whereby the nucleus is dehalogenated and the corresponding substituted-pyridone is obtained. For example, to obtain 4,6-bis[-($\alpha$-dimethylamino)ethyl]-2[1H]-pyridone, 3,5-dihalo-4,6-diethyl-2[1H]-pyridone is treated with dimethylamine as shown by equation 4 below:

4) 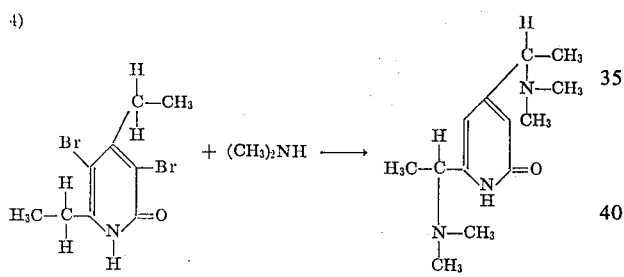

To obtain the novel substituted-pyridones represented by Formulae II–IV, the halo-substituted-pyridone is treated with a nucleophilic reagent whereby the nucleus is dehalogenated and the corresponding substituted-pyridone is obtained. For example, to obtain 8-dimethylamino-5,6,7,8-tetrahydroquinolone, 3-halo-5,6,7,8-tetrahydroquinolone is treated with dimethylamine as shown by equation 5 below:

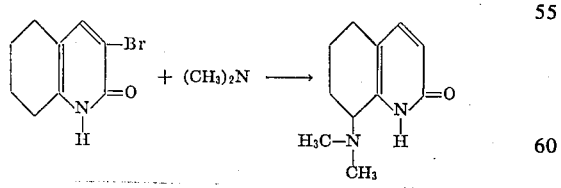

Representative of the compounds of the invention include the following:

4-dimethylaminomethyl-2[1H]-pyridone
4-diethylaminomethyl-2[1H]-pyridone
6-diethylaminomethyl-2[1H]-pyridone
4-methylaminomethyl-2[1H]-pyridone
6-methylaminomethyl-2[1H]-pyridone
4-methylethylaminomethyl-2[1H]-pyridone
6-methylethylaminomethyl-2[1H]-pyridone
4-dipropylaminomethyl-2[1H]-pyridone
6-dipropylaminomethyl-2[1H]-pyridone
4-($\beta$-hydroxydiethylaminomethyl)-2[1H]-pyridone
6-($\beta$-hydroxydiethylaminomethyl)-2[1H]-pyridone
4,6-bis($\beta$-hydroxydiethylaminomethyl)-2[1H]-pyridone
4,6-bis-(dimethylaminomethyl)-2[1H]pyridone
4,6-bis-(dipropylaminomethyl)-2[1H]pyridone
4-benzylaminomethyl-2[1H]pyridone
4-(1-piperidinomethyl)-2[1H]pyridone
4-(1-azepinomethyl)-2[1H]pyridone
4-methoxymethyl-2[1H]pyridone
4-methylthiomethyl-2[1H]pyridone
6-methylthiomethyl-2[1H]pyridone
4,6-bis-(dimethylthiomethyl)-2[1H]pyridone
4-phenylsulfinyloxymethyl-2[1H]pyridone
6-phenylsulfinyloxymethyl-2[1H]pyridone
4-benzylthiomethyl-2[1H]pyridone
5-methyl-6-[($\alpha$-dimethylamino)ethyl]-2[1H]pyridone
5-methyl-4-[($\alpha$-dimethylamino)ethyl]-2[1H]pyridone
5-methyl-6-[($\alpha$-methylethylamino)ethyl]-2[1H]pyridone
5-ethyl-6-[($\alpha$-methylethylamino)ethyl]-2[1H]pyridone
5-butyl-6-[($\alpha$-methylethylamino)ethyl]-2[1H]pyridone
3-methyl-6-[($\alpha$-methylethylamino)ethyl]-2[1H]pyridone
3-butyl-6-[($\alpha$-methylethylamino)ethyl]-2[1H]pyridone
3-butyl-6-[$\alpha$-($\beta$-hydroxydiethylamino)ethyl]-2[1H]pyridone
1,5-dimethyl-4-[($\alpha$-phenethylthio)ethyl]-2[1H]pyridone
1-methyl-4-benzylaminomethyl-2[1H]pyridone
4-methylaminomethyl-1-methyl-2[1H]pyridone
4-diethylaminomethyl-1-methyl-2[1H]pyridone
4-methylethylaminomethyl--methyl-2[1H]pyridone
4-methylpropylaminomethyl-1-methyl-2[1H]pyridone
4-dipropylaminomethyl-1-methyl-2[1H]pyridone
4-ethylpropylaminomethyl-1-methyl-2[1H]pyridone
4-ethylaminomethyl-1-methyl-2[1H]pyridone
4-propylaminomethyl-1-methyl-2[1H]pyridone
4-butylaminomethyl-1-methyl-2[1H]pyridone
4-$\beta$-hydroxydiethylaminomethyl-1-methyl-2[1H]pyridone
4-bis-ethanolaminomethyl-1methyl-2[1H]pyridone
4-phenethylaminomethyl-1-methyl-2[1H]pyridone
4-benzylmethylaminomethyl-1-methyl-2[1H]pyridone
4-(1-pyrrolidino)-methyl-1-methyl-2[1H]pyridone
4-(1-piperidino)-methyl-1-methyl-2[1H]pyridone
4-(1-azepino)-methyl-1-methyl-2[1H]pyridone
4-aminomethyl-1-methyl-2[1H]pyridone
4-methoxymethyl-1-methyl-2[1H]pyridone
4-methylthiomethyl-1-methyl-2[1H]pyridone
4-benzylthiomethyl-1-methyl-2[1H]pyridone
4-ethylthiomethyl-1-methyl-2[1H]pyridone 4-phenethylthiomethyl-1-methyl-2[1H]pyridone
4-bis-(carboethoxy)-methyl-1-methyl-2[1H]pyridone
4-methylsulfinyloxymethyl-1-methyl-2[1H]pyridone
4-ethoxymethyl-1-methyl-2[1H]pyridone
8-methylamino-5,6,7,8-tetrahydroquinolone
8-diethylamino-5,6,7,8-tetrahydroquinolone
8-methylethylamino-5,6,7,8-tetrahydroquinolone
8-methylpropylamino-5,6,7,8-tetrahydroquinolone
8-dipropylamino-5,6,7,8-tetrahydroquinolone
8-ethylpropylamino-5,6,7,8-tetrahydroquinolone
8-ethylamino-5,6,7,8-tetrahydroquinolone
8-propylamino-5,6,7,8-tetrahydroquinolone
8-butylamino-5,6,7,8-tetrahydroquinolone
8-(bis-ethanolamino)-5,6,7,8-tetrahydroquinolone
8-benzylamino-5,6,7,8-tetrahydroquinolone
8-phenethylamino-5,6,7,8-tetrahydroquinolone
8-benzylmethylamino-5,6,7,8-tetrahydroquinolone
8-(1-pyrrolidino)-5,6,7,8-tetrahydroquinolone
8-(1-piperidino)-5,6,7,8-tetrahydroquinolone
8-(1-azepino)-5,6,7,8-tetrahydroquinolone
8-amino-5,6,7,8-tetrahydroquinolone
8-methoxy-5,6,7,8-tetrahydroquinolone
8-methylthio-5,6,7,8-tetrahydroquinolone
8-ethylthio-5,6,7,8-tetrahydroquinolone
8-phenylsulfinyloxy-5,6,7,8-tetrahydroquinolone
8-phenethylthio-5,6,7,8-tetrahydroquinolone
8-bis-(carboethoxy)methylene-5,6,7,8-tetrahydroquinolone
8-ethoxy-5,6,7,8-tetrahydroquinolone
8-methyl-8-piperidino-5,6,7,8-tetrahydroquinolone
8-propyl-8-benzylamino-5,6,7,8-tetrahydroquinolone
8-isopropyl-8-azepino-5,6,7,8-tetrahydroquinolone
5-benzyl-4 or 6-dimethylaminomethyl-2[1H]-pyridone
1,5-dimethyl-4 or 6-dimethylaminomethyl-2[1H]-pyridone
1,4-bis-diethylaminomethyl-2[1H]-pyridone
1-phenyl-5-methylthio-4-[(α-diethylamino)ethyl]-2[1H]-pyridone
1-methoxymethyl-3-phenylthio-6-[(α-piperidino)propyl]-2-[1H]-pyridone
1-carboxymethyl-3-hydroxy-4-[α-piperidino)-propyl]-2[1H]-pyridone
1-vinyl-3-cyano-6-[(α-1-piperidino)propyl]-2[1H]-pyridone
2-oxo-7-methylethylamino-1,2,6,7-tetrahydro-5H-[1]pyrindine
1-oxo-5-methylethylamino-1,2,6,7-tetrahydro-5H-[2]-pyrindine
2-oxo-7-dipropylamino-1,2,6,7-tetrahydro-5H-[1]-pyrindine
1-oxo-5-dipropylamino-1,2,6,7-tetrahydro-5H-[2]-pyrindine
2-oxo-7-ethylamino-1,2,6,7-tetrahydro-5H-[1]-pyrindine
1-oxo-5-ethylamino-1,2,6,7-tetrahydro-5H-[2]-pyrindine
2-oxo-7-butylamino-1,2,6,7-tetrahydro-5H-[1]-pyrindine
1-oxo-5-butylamino-1,2,6,7-tetrahydro-5H-[2]-pyrindine
2-oxo-7-bis-ethanolamino-1,2,6,7-tetrahydro-5H-[1]-pyrindine
1-oxo-5-bis-ethanolamino-1,2,6,7-tetrahydro-5H-[2]-pyrindine
2-oxo-7-phenethylamino-1,2,6,7-tetrahydro-5H-[1]-pyrindine
1-oxo-5-phenethylamino-1,2,6,7-tetrahydro-5H-[2]-pyrindine
2-oxo-7-(1-pyrrolidino)-1,2,6,7-tetrahydro-5H-[1]-pyrindine
1-oxo-5-(1-pyrrolidino)-1,2,6,7-tetrahydro-5H-[2]-pyrindine
2-oxo-7-amino-1,2,6,7-tetrahydro-5H-[1]-pyrindine
1-oxo-5-amino-1,2,6,7-tetrahydro-5H-[2]-pyrindine
2-oxo-7-methylthio-1,2,6,7-tetrahydro-5H-[1]-pyrindine
1-oxo-5-methylthio-1,2,6,7-tetrahydro-5H-[2]-pyrindine
1-methyl-2-oxo-7-methylamino-1,2,6,7-tetrahydro-5H-[1]-pyrindine
1-methyl-2-oxo-7-ethylpropylamino-1,2,6,7-tetrahydro-5H-[1]-pyrindine
1-methyl-2-oxo-7-propylamino-1,2,6,7-tetrahydro-5H-[1]-pyrindine
1-methyl-2-oxo-7-benzylamino-1,2,6,7-tetrahydro-5H-[1]-pyrindine
1-methyl-2-oxo-7-benzylethylamino-1,2,6,7-tetrahydro-5H-[1]-pyrindine
1-methyl-2-oxo-7-(1-piperidino)-1,2,6,7-tetrahydro-5H-[1]-pyrindine
1-methyl-2-oxo-7-amino-1,2,6,7-tetrahydro-5H-[1]-pyrindine
1-methyl-2-oxo-7-ethylthio-1,2,6,7-tetrahydro-5H-[1]-pyrindine
1-methyl-2-oxo-7-ethoxy-1,2,6,7-tetrahydro-5H-[1]-pyrindine
8-methylbutylamino-5,6,7,8-tetrahydroquinolone
8-ethylpropylamino-5,6,7,8-tetrahydroquinolone
8-ethylbutylamino-5,6,7,8-tetrahydroquinolone
8-ethylpentylamino-5,6,7,8-tetrahydroquinolone
8-ethoxy-5,6,7,8-tetrahydroquinolone
8-propylthio-5,6,7,8-tetrahydroquinolone
8-butylpropylamino-5,6,7,8-tetrahydroquinolone
8-butylthio-5,6,7,8-tetrahydroquinolone
8-propyloxy-5,6,7,8-tetrahydroquinolone
8-o-chlorobenzylthio-5,6,7,8-tetrahydroquinolone
8-n-chlorobenzylthio-5,6,7,8-tetrahydroquinolone
8-p-bromobenzylthio-5,6,7,8-tetrahydroquinolone
8-phenoxy-5,6,7,8-tetrahydroquinolone
8-p-tolyloxy-5,6,7,8-tetrahydroquinolone
8-m-tolyloxy-5,6,7,8-tetrahydroquinolone
8-phenylsulfinyloxy-5,6,7,8-tetrahydroquinolone
8-p-tolylsulfinyloxy-5,6,7,8-tetrahydroquinolone
8-p-chlorophenoxy-5,6,7,8-tetrahydroquinolone
8-(bis-propanolamino)-5,6,7,8-tetrahydroquinolone
8-bis(carboxymethoxy)methylene-5,6,7,8-tetrahydroquinolone
8-p-methoxybenzylamino-5,6,7,8-tetrahydroquinolone
8-p-chloroanilino-5,6,7,8-tetrahydroquinolone
8-methylphenethylamino-5,6,7,8-tetrahydroquinolone
8-p-chlorobenzyloxy-5,6,7,8-tetrahydroquinolone The substituted pyridones and tetrahydroquinolones of the invention possess a high degree of anti-inflammatory, analgesic and anti-pyretic activity. They are of value in the treatment of arthritic and dermatological disorders or like conditions responsive to anti-inflammatory drugs. In general, they are indicated for a wide variety of conditions where one or more of the symptons of inflammation, fever and pain are manifested. Included within this category are diseases such as rheumatoid arthritis, osteoarthritis, gout, infectious arthritis and rheumatic fever. As indicated above, the compounds of the invention also possess a useful degree of analgesic and anti-pyretic activity.

For these purposes, the compounds of the invention may be administered orally, topically, parenterally, by inhalation spray or rectally in formulations containing conventional non-toxic pharmaceutically acceptable carriers, adjuvants and vehicles. The term parenteral as used herein includes subcutaneous injections, intravenous, intramuscular, intrasternal injection or infusion techniques. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, colouring agents and preserving agents in order to provide a pharmaceutically elegant and palatable preparation. Tablets contain the active ingredient in admixture with non-toxic pharmaceutically acceptable excipients which are suitable for the manufacture of tablets. These excipients may be, for example, inert diluents such as calcium carbonate, sodium carbonate, lactose, calcium phosphate or sodium phosphate; granulating and disintegrating agents, for example, maize starch or alginic acid; binding agents, for example, starch, gelatin or acacia; and lubricating agents, for example, magnesium stearate, stearic acid or talc. The tablets may be uncoated or they may be coated by known techniques to delay disintegration and absorption in the gastro-intestinal tract and thereby provide a sustained action over a longer period. For example, a time delay material such as glyceryl monsterate or glyceryl distearate above or with a wax may be employed.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example, arachis oil, peanut oil, liquid paraffin or olive oil.

Aqueous suspensions contain the active materials in admixture with excipients suitable for the manufacture of aqueous suspensions. Such excipients are suspending agents, for example, sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example, lecithin; or condensation products of an alkylene oxide with fatty acids, for example, polyoxyethylene stearate; or condensation products of ethylene oxide with long chain aliphatic alcohols, for example, heptadecaethyleneoxycetanol; or condensation products of ethylene oxide with partial esters derived from fatty acids and a hexitol such as polyoxyethylene sorbitol monooleate; or condensation products of ethylene oxide with partial esters derived from fatty acids and hexitol anhydrides, for example, polyoxyethylene sorbitan monooleate. The said aqueous suspensions may also contain one or more preservatives, for example, ethyl, or n-propyl, p-hydroxy benzoate, one or more colouring agents, one or more flavoring agents and one or more sweetening agents, such as sucrose, saccharin or sodium or calcium cyclamate.

Oily suspensions may be formulated by suspending the active ingredient in a vegetable oil, for example, arachis oil, olive oil, sesame oil or coconut oil, or in a mineral oil such as liquid paraffin. The oily suspensions may contain a thickening agent, for example, beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and colouring agents, may also be present.

The pharmaceutical compositions of the invention may also be in the form of oil-in-water emulsions. The oily phase may be a vegetable oil, for example, olive oil or arachis oil; or a mineral oil, for example, liquid paraffin or mixtures of these. Suitable emulsifying agents may be naturally-occurring gums, for example, gum acacia or gum tragacanth; naturally-occurring phosphatides, for example, soya bean, lecithin; and esters or partial esters derived from fatty acids and hexitol anhydrides, for example, sorbitan mono-oleate, and condensation products of the said partial esters with ethylene oxide, for example, polyoxyethylene sorbitan monooleate. The emulsions may also contain sweetening and flavoring agents.

Syrups and elixirs may be formulated with sweetening agents, for example, glycerol, sorbitol or sucrose. Such formulations may also contain a demulcent, a preservative and flavoring and colouring agents. The pharmaceutical compositions may be in the form of a sterile injectable preparation, for example, as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic, parenterally-acceptable diluent or solvent, for example, as a solution in 1:3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or di-glycerides. In addition, fatty acids such as oleic acid find use in the preparation of injectibles.

The compounds of this invention may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

For topical use, creams, ointments, jellies, solutions or suspensions, etc. containing the anti-inflammatory agents are employed.

Dosage levels of the order of 10 mg. to 7 grams per day are useful in the treatment of the above indicated conditions. For example, inflammation is effectively treated and anti-pyretic and analgesic activity manifested by the administration of from about 0.5 to 100 milligrams of the compound per kilogram of body weight per day. Advantageously from about 2 mg. to about 50 mg. per kilogram of body weight and especially from about 4 mg. to about 20 mg./kg. per daily dosage produce highly effective results.

The amount of active ingredient that may be combined with the carrier materials to produce a single dosage form will vary depending upon the host treated and the particular mode of administration. For example, a formulation intended for the oral administration of humans may contain from 5 mg. to 5 grams of active agent compounded with an appropriate and convenient amount of carrier material which may vary from about 5 to about 95 percent of the total composition. Dosage unit forms will generally contain between from about 25 mg. to about 500 mg. of active ingredient.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

The pharmaceutically acceptable salts of the anti-inflammatory, analgesic and anti-pyretic compounds are to be considered as included within the scope of the invention. Representative examples of said pharmaceutically acceptable salts are hydrohalide, sulfate, citrate or tartrate.

The reaction can be carried out with or without an inert solvent, at temperatures ranging from 80°C.–200°C. in a sealed tube or refluxing. The time necessary to carry out the reaction can vary from about several hours to several days. For example, if inert solvents are employed, suitable inert solvents are dimethylformamide, N-methylpyrrolidone, water, methanol, t-butanol, dimethylsulfoxide, benzene, toluene, xylene, dioxane, tetrahydrofuran and the like, the choice of solvent depending in part on the specific nucleophile employed.

The starting materials employed in the invention are represented by Formulae V, VI, VII and VIII. Said starting materials are known and processes for their preparation can be found throughout the literature. For example, see J.A.C.S. 71, 1186–95 (1949) and J.A.C.S. 77, 6353–55 (1955).

Representatives of the nucleophilic reagents which can be employed in the novel process disclosed herein are as shown below:

dimethylamine
methylamine
ethylamine
diethylamine
propylamine
butylamine
methylethylamine
methylpropylamine
sodium methoxide
sodium ethoxide
sodium methylmercaptide
sodium ethylmercaptide
sodium phenylmercaptide
potassium benzylmercaptide
sodium-p-tolylsulfinate
sodium acetate
potassium acetate
hydroxylamine
hydrazine
semicarbazine
sodium hydroxide
potassium hydroxide
phthalimide
sodium cyanide
potassium cyanide
phenylhydrazine
sodiodimethylmalonate
benzylethylamine
methylbutylamine
cyclopentylamine
aniline
diethanolamine
triethylamine
N-methylaniline
anisidine
thiourea
sodium hydroxyethylmercaptide
sodium ethylsulfinate
sodium phenylsulfinate
ammonia
trimethyl phosphine The following examples illustrate the preparation of the various pyridone compounds described as anti-inflammatory, analgesic and anti-pyretic agents. The examples should be construed as illustrations of the invention rather than limitations thereof.

EXAMPLE 1

4-Dimethylaminomethyl-2[1H]-pyridone hydrobromide

A mixture of 3-bromo-4-methyl-2[1H]-pyridone (1.9 g., 0.01 mole), 40% aqueous dimethylamine (9 ml.) and dimethylformamide (30 ml.) is sealed in a glass tube and heated at 140°C. for 5 days. The volatile materials are removed in vacuo at 100°C., and the residue stirred with ether, filtered and dried to yield 4-dimethylaminomethyl-2[1H]-pyridone as the hydrobromide, m.p. 280°C., dec.

When other nucleophilic reagents in their appropriate solvent are substituted for dimethylamine, the corresponding product is obtained. For example, when methylamine, diethylamine, methylethylamine, methylpropylamine, dipropylamine, ethylpropylamine, ethylamine, propylamine, butylamine, β-hydroxydiethylamine, bis-ethanolamine, benzylamine, phenethylamine, benzylmethylamine, pyrrolidine, piperidine, azepine, ammonia, potassium hyroxide, sodium methoxide, methylmercaptan, sodium benzylmercaptide, sodium ethylmercaptide, sodium phenylsulfinate, phenethylmercaptan, sodium diethylmalonate, sodium methylsulfinate or sodium ethoxide is employed, there is obtained 4-methylaminomethyl-2[1H]-pyridone, 4-diethylaminomethyl2[1H]-pyridone, 4-methylethylaminomethyl-2[1H]-pyridone, 4-methylpropylaminomethyl-2[1H]-pyridone, 4-dipropylaminomethyl-2[1H]-pyridone, 4-ethylpropylaminomethyl-2[1H]-pyridone, 4-ethylaminomethyl-2[1H]-pyridone, 4-propylaminomethyl-2[1H]-pyridone, 4-butylaminomethyl-2[1H]-pyridone, 4-(β-hydroxydiethylaminomethyl)-2[1H]-pyridone, 4-(bis-ethanolaminomethyl)-2[1H]-pyridone, 4-benzylaminomethyl-2[1H]-pyridone, 4-phenethylaminomethyl-2[1H]-pyridone, 4-benzylmethylaminomethyl-2[1H]-pyridone, 4-benzylmethylaminomethyl-2[1H]-pyridone, 4-(1-pyrrolidino)-methyl-2[1H]-pyridone, 4-(1-piperidino)-methyl-2[1H]-pyridone, 4-(1-azepino)-methyl-2[1H]-pyridone, 4-aminomethyl-2[1H]-pyridone (generally isolated as the hydrohalide), 4-methoxymethyl-2[1H]-pyridone, 4-hydroxymethyl-2[1H]-pyridone, 4-methylthiomethyl-2[1H]-pyridone, 4-benzylthiomethyl-2[1H]-pyridone, 4-ethylthiomethyl-2[1H]-pyridone, 4-phenylsulfinyloxymethyl-2[1H]-pyridone, 4-phenethylthiomethyl-2[1H]-pyridone, 4-β-(bis-carboethoxy)-ethyl-2[1H]-pyridone, 4-methylsulfinyloxymethyl-2[1H]-pyridone or 4-ethoxymethyl-2[1H]-pyridone, respectively.

EXAMPLE 2

6-Dimethylaminomethyl-2[1H]-pyridone hydrobromide

The procedure of Example 1 is repeated except that the starting material is 5-bromo-6-methyl-2[1H]-pyridone. Using the same reaction conditions and techniques, there is obtained the product, 6-dimethylaminomethyl-2[1H]-pyridone hydrobromide, m.p. 240°C., dec.

EXAMPLE 3

5-Methyl-6-[(α-dimethylamino)ethyl]-2[1H]-pyridone hydrobromide

The procedure of Example 1 is repeated except that the starting material is 3-bromo-6-ethyl-5-methyl-2[1H]-pyridone. Using the same reaction conditions and techniques, there is obtained the product, 5-methyl-6-[(α-dimethylamino)ethyl]-2[1H]-pyridone as the hydrobromide salt.

When other nucleophilic reagents in their appropriate solvent are substituted for dimethylamine, the corresponding product is obtained. For example, when methylamine, diethylamine, methylethylamine, methylpropylamine, dipropylamine, ethylpropylamine, ethylamine, propylamine, butylamine, β-hydroxydiethylamine, bis-ethanolamine, benzylamine, phenethylamine, benzylmethylamine, pyrrolidine, piperidine, azepine, ammonia, potassium hydroxide, sodium methoxide, methylmercaptan, sodium benzylmercaptide, sodium ethylmercaptide, sodium phenylsulfinate, phenethylmercaptan, sodium diethylmalonate, sodium methylsulfinate or sodium ethoxide is employed, there is obtained 5-methyl-6-[(α-dimethylamino)ethyl]-2[1H]-pyridone hydrobromide, 5-methyl-6-[(α-diethylamino)ethyl]-2[1H]-pyridone, 5-methyl-6-[(α-methylethylamino)ethyl]-2[1H]-pyridone, 5-methyl-6-[(α-methylpropylamino)ethyl]-2[1H]-pyridone, 5-methyl-6-[(α-dipropylamino)ethyl]-2[1H]-pyridone, 5-methyl-6-[(α-ethylpropylamino)ethyl]-2[1H]-pyridone, 5-methyl-6-[(α-ethylamino)ethyl]-2[1H]-pyridone, 5-methyl-6-[(α-propylamino)ethyl]-2[1H]-pyridone, 5-methyl-6-[(α-butylamino)ethyl]-2[1H]-pyridone, 5-methyl-6-[(α-β-hydroxydiethylamino)ethyl]-2[1H]-pyridone, 5-methyl-6-[α-bis-ethanolamino)ethyl]-2[1H]-pyridone, 5-methyl-6-[(α-benzylamino)-ethyl]-2[1H]-pyridone, 5-methyl-6-[(α-phenethylamino)ethyl]-2[1H]-pyridone, 5-methyl-6-[(α-benzylmethylamino)ethyl]-2[1H]-pyridone, 5-methyl-6-[(1-pyrrolidino)ethyl]-2[1H]-pyridone, 5-methyl-6-[(1-piperidino)-ethyl]-2[1H]-pyridone, 5-methyl-6-[(1-azepino(ethyl]-2[1H]-pyridone, 5-methyl-6-[(α-amino)ethyl]-2[1H]-pyridone (generally isolated as the hydrohalide), 5-methyl-6-[(α-hydroxy)ethyl]-2[1H]-pyridone, 5-methyl-6-[(α-methoxy)-ethyl]-2[1H]-pyridone, 5-methyl-6-[(α-methylthio)ethyl]-2[1H]-pyridone, 5-methyl-6-[(α-benzylthio)ethyl]-2[1H]-pyridone, 5-methyl-6-[(α-ethylthio)ethyl]-2[1H]-pyridone, 5-methyl-6-[(α-phenylsulfinyloxy)ethyl]-2[1H]-pyridone, 5-methyl-6-[(α-phenethylthio)ethyl]-2[1H]-pyridone, 5-methyl-6-[α-(bis-carboethoxy)methyl ethyl]-2[1H]-pyridone, 5-methyl-6-[(α-methylsulfinyloxy)ethyl]-2[1H]-pyridone or 5-methyl-6-[(α-ethoxy)ethyl]-2[1H]-pyridone, respectively.

EXAMPLE 4

4-Dimethylaminomethyl-1-methyl-2[1H]-pyridone hydrobromide

The procedure of Example 1 is repeated except that the starting material is 3-bromo-1,4-dimethyl-2-[1H]-pyridone. Using the same reaction conditions and techniques, there is obtained the product 4-dimethylaminomethyl-1-methyl-2[1H]-pyridone hydrobromide.

When other nucleophilic reagents in their appropriate solvent are substituted for dimethylamine, the corresponding product is obtained. For example, when methylamine, diethylamine, methylethylamine, methylpropylamine, dipropylamine, ethylpropylamine, ethylamine, propylamine, butylamine. β-hydroxydiethylamine, bis-ethanolamine, benzylamine, phenethylamine, benzylmethylamine, pyrrolidine, piperidine, azepine, ammonia, potassium hydroxide, sodium methoxide, methylmercaptan, sodium benzylmercaptide, sodium ethylmercaptide, sodium phenylsulfinate, phenethylmercaptan, sodium diethylmalonate, sodium methylsulfinate or sodium ethoxide is employed, there is obtained 4-methylaminomethyl-1-methyl-2[1H]-pyridone, 4-diethylaminomethyl-1-methyl-2[1H]-pyridone, 4-methylethylamine-1-methyl-2[1H]-pyridone, 4-methylpropylaminomethyl-1-methyl-2[1H]-pyridone, 4-dipropylaminomethyl-1-methyl-2[1H]-pyridone, 4-ethylpropylaminomethyl-1-methyl-2[1H]-pyridone, 4-ethylaminomethyl-1-methyl-2[1H]-pyridone, 4-propylaminomethyl-1-methyl-2[1H]-pyridone, 4-butylaminomethyl-1-methyl-2[1H]-pyridone, 4-β-hydroxydiethylaminomethyl-1-methyl-2[1H]-pyridone, 4-bis-ethanolaminomethyl-1-methyl-2[1H]-pyridone, 4-benzylaminomethyl-1-methyl-2[1H]-pyridone, 4-phenethylaminomethyl-1-methyl-2[1H]-pyridone, 4-benzylmethylaminomethyl-1-methyl-2[1H]-pyridone, 4-(1-pyrrolidinomethyl)-1-methyl-2[1H]-pyridone, 4-(1-piperidinomethyl)-1-methyl- 2[1H]-pyridone, 4-(1-azepinomethyl)-1-methyl-2[1H]-pyridone, 4-aminomethyl-1-methyl-2[1H]-pyridone (generally isolated as the hydrohalide), 4-hydroxymethyl-1-methyl-2[1H]-pyridone, 4-methoxymethyl-1-methyl-2[1H]-pyridone, 4-methylthiomethyl-1-methyl-2[1H]-pyridone, 4-benzylthiomethyl-1-methyl-2[1H]-pyridone, 4-ethylthiomethyl-2[1H]-pyridone, 4-phenylsulfinylarylmethyl-1-methyl-2[1H]-pyridone, 4-phenethylthiomethyl-1-methyl-2[1H]-pyridone, 4-$\beta$-(bis-carboethoxy)ethyl-1-methyl-2[1H]-pyridone, 4-methylsulfinyloxymethyl-1-methyl-2[1H]-pyridone or 4-ethoxymethyl-1-methyl-2[1H]-pyridone, respectively.

EXAMPLE 5

6-($\alpha$-Anilinoethyl)-5-methyl-2[1H]-pyridone

A mixture of 3-bromo-6-ethyl-1-methyl-2[1H]-pyridone (4.3 g., 0.02 mole), aniline (6 ml.), potassium t-butoxide (6 g.) and t-butanol (80 ml.) is heated in a sealed tube at 150°C. for 48 hours. On cooling, the mixture is filtered and the filtrate is concentrated in vacuo to a residue. The residue is extracted with 2.5 N hydrochloric acid, the acid solution is filtered and neutralized with sodium bicarbonate. Recrystallization from benzene of the resulting precipitate yields 6-($\alpha$-anilinoethyl)-5-methyl-2[1H]-pyridone, m.p. 221°–225°C.

EXAMPLE 6

8-($\beta$-Hydroxydiethylamino)-5,6,7,8-tetrahydroquinolone

A mixture of 3-bromo-5,6,7,8-tetrahydroquinolone (1.1 g., 0.005 mole), $\beta$-hydroxydiethylamine (5 ml.) and N-methylpyrrolidone (30 ml.) is heated in a sealed tube at 180°C. for 6 days. The tube is opened, the contents filtered, and the filtrate concentrated in vacuo to a residue. The residue is triturated with ether and filtered. The solid is triturated with acetone, filtered, and recrystallized from methanol to yield 8-($\beta$-hydroxydiethylamino)-5,6,7,8-tetrahydroquinolone, m.p. 184°–185°C.

When other nucleophilic reagents in their appropriate solvent are substituted for $\beta$-hydroxydiethylamine, the corresponding product is obtained. For example, when methylamine, diethylamine, methylethylamine, methylpropylamine, dipropylamine, ethylpropylamine, ethylamine, propylamine, butylamine, bis-ethanolamine, benzylamine, phenethylamine, benzylmethylamine, pyrrolidine, piperidine, azepine, ammonia, potassium hydroxide, sodium methoxide, methylmercaptan, sodium benzylmercaptide, sodium ethylmercaptide, sodium phenylsulfinate, sodium phenethylmercaptide, sodium diethylmalonate, sodium methylsulfinate or sodium ethoxide is employed, there is obtained 8-methylamino-5,6,7,8-tetrahydroquinolone, 8-diethylamino-5,6,7,8-tetrahydroquinolone, 8-methylethylamino-5,6,7,8-tetrahydroquinolone, 8-methylpropylamino-5,6,7,8-tetrahydroquinolone, 8-dipropylamino-5,6,7,8-tetrahydroquinolone, 8-ethylpropylamino-5,6,7,8-tetrahydroquinolone, 8-ethylamino-5,6,7,8-tetrahydroquinolone, 8-propylamino-5,6,7,8-tetrahydroquinolone, 8-butylamino-5,6,7,8-tetrahydroquinolone, 8-(bis-ethanolamino)-5,6,7,8-tetrahydroquinolone, 8-benzylamino-5,6,7,8-tetrahydroquinolone, 8-phenethylamino-5,6,7,8-tetrahydroquinolone, 8-benzylmethylamino-5,6,7,8-tetrahydroquinolone, 8-(1-pyrrolidino)-5,6,7,8-tetrahydroquinolone, 8-(1-piperidino)-5,6,7,8-tetrahydroquinolone, 8-(1-azepino)-5,6,7,8-tetrahydroquinolone, 8-amino-5,6,7,8-tetrahydroquinolone, 8-hydroxy-5,6,7,8-tetrahydroquinolone, 8-methoxy-5,6,7,8-tetrahydroquinolone, 8-methylthio-5,6,7,8-tetrahydroquinolone, 8-benzylthio-5,6,7,8-tetrahydroquinolone, 8-ethylthio-5,6,7,8-tetrahydroquinolone, 8-phenylsulfinyloxy-5,6,7,8-tetrahydroquinolone, 8-phenethylthio-5,6,7,8-tetrahydroquinolone, 8-bis-(carboethoxy)methyl-5,6,7,8-tetrahydroquinolone, 8-methylsulfinyloxy-5,6,7,8-tetrahydroquinolone or 8-ethoxy-5,6,7,8-tetrahydroquinolone, respectively.

EXAMPLE 7

The procedure of Example 6 is repeated except that the starting material is 1-methyl-3-bromo-5,6,7,8-tetrahydroquinolone, 1-phenyl-3-bromo-5,6,7,8-tetrahydroquinolone or 1-benzyl-3-bromo-5,6,7,8-tetrahydroquinolone. Using the same reaction conditions and techniques, there is obtained the product, 1-methyl-8-($\beta$-hydroxydiethylamino)-5,6,7,8-tetrahydroquinolone, 1-phenyl-8-($\beta$-hydroxydiethylamino)-5,6,7,8-tetrahydroquinolone or 1-benzyl-8-($\beta$-hydroxydiethylamino)-5,6,7,8-tetrahydroquinolone, respectively.

When other nucleophilic reagents in their appropriate solvent are substituted for $\beta$-hydroxydiethylamine, the corresponding product is obtained, For example, when methylamine, diethylamine, methylethylamine, methylpropylamine, dipropylamine, ethylpropylamine, ethylamine, propylamine, butylamine, bis-ethanolamine, benzylamine, phenethylamine, benzylmethylamine, pyrrolidine, piperidine, azepine, ammonia, potassium hydroxide, sodium methoxide, methylmercaptan, sodium benzylmercaptide, sodium ethylmercaptide, sodium phenylsulfinate, phenethylmercaptan, sodium diethylmalonate, sodium methylsulfinate or sodium ethoxide is employed, there is obtained the corresponding 1-methyl, phenyl or benzyl-8-substituted-tetrahydroquinolone.

EXAMPLE 8

1-Methyl-6-[($\alpha$-dimethylamino)propyl]-2[1H]-pyridone hydrobromide

The procedure of Example 1 is repeated except that the starting material is 1-methyl-3-bromo-6-propyl-2[1H]-pyridone. Using the same reaction conditions and techniques, there is obtained the product, 1-methyl-6-[($\alpha$-dimethylamino)propyl]-2[1H]-pyridone hydrobromide.

When other nucleophilic reagents in their appropriate solvent are substituted for dimethylamine, the corresponding product is obtained. For example, when methylamine, diethylamine, methylethylamine, methylpropylamine, dipropylamine, ethylpropylamine, ethylamine, propylamine, butylamine, $\beta$-hydroxydiethylamine, bis-ethanolamine, benzylamine, phenethylamine, benzylmethylamine, pyrrolidine, piperidine, azepine, ammonia, potassium hydroxide, sodium methoxide, methylmercaptan, sodium benzylmercaptide, sodium ethylmercaptide, sodium phenylsulfinate, phenethylmercaptan, sodium diethylmalonate, sodium methylsulfinate or sodium ethoxide is substituted for dimethylamine, there is obtained the corresponding 1-methyl-6-[(α-substituted)propyl]-2[1H]-pyridone.

EXAMPLE 9

The procedure of Example 6 is repeated except that the starting material is 1methyl, phenyl or benzyl-3-bromo-8-methyl-5,6,7,8-tetrahydroquinolone. Using the same reaction conditions and techniques, there is obtained 1-methyl, phenyl or benzyl-8-(β-hydroxydiethylamino)-8-methyl-5,6,7,8-tetrahydroquinolone.

When other nucleophilic reagents in their appropriate solvent are substituted for β-(hydroxydiethylamine, the corresponding product is obtained. For example, when methylamine, diethylamine, methylethylamine, methylpropylamine, dipropylamine, ethylpropylamine, ethylamine, propylamine, butylamine, bis-ethanolamine, benzylamine, phenethylamine, benzylmethylamine, pyrrolidine, piperidine, azepine, ammonia, potassium hydroxide, sodium methoxide, methylmercaptan, sodium benzylmercaptide, sodium ethylmercaptide, sodium phenylsulfinate, phenethylmercaptan, sodium diethylmalonate, sodium methylsulfinate or sodium ethoxide is employed, there is obtained the corresponding 1-methyl, phenyl or benzyl-8-methyl-8-substituted-5,6,7,8-tetrahydroquinolone.

EXAMPLE 10

2-oxo-7-(β-hydroxydiethylamino)-1,2,6,7-tetrahydro-5H-[1]-pyridine

The procedure of Example 6 is repeated except that the starting material is 2-oxo-3-bromo-1,2,6,7-tetrahydro-5H-[1]-pyridine. Using the same reaction conditions and techniques, there is obtained the product, 2-oxo-7-(β-hydroxydiethylamino)-1,2,6,7-tetrahydro-5H-[1]-pyridine.

When other nucleophilic reagents in their appropriate solvent are substituted for β-hydroxydiethylamine, the corresponding product is obtained. For example, when methylamine, diethylamine, methylethylamine, methylpropylamine, dipropylamine, ethylpropylamine, ethylamine, propylamine, butylamine, β-hydroxydiethylamine, bisethanolamine, benzylamine, phenethylamine, benzylmethylamine, pyrrolidine, piperidine, azepine, ammonia, potassium hydroxide, sodium methoxide, methylmercaptan, sodium benzylmercaptide, sodium ethylmercaptide, sodium phenylsulfinate, phenethylmercaptan, sodium diethylmalonate, sodium methylsulfinate or sodium ethoxide is employed, there is obtained the corresponding tetrahydro-5H-1-pyrindine.

EXAMPLE 11

The procedure of Example 6 is repeated except that the starting material is 1-oxo-4-bromo-1,2,6,7-tetrahydro-5H-2-pyrindine. Using the same reaction conditions and techniques, there is obtained the product 1-oxo-5-(β-hydroxydiethylamino)-1,2,6,7-tetrahydro-5H-2-pyrindine.

When other nucleophilic reagents in their appropriate solvent are substituted for β-hydroxydiethylamine, the corresponding product is obtained. For example, when methylamine, diethylamine, methylethylamine, methylpropylamine, dipropylamine, ethylpropylamine, ethylamine, propylamine, butylamine, β-hydroxydiethylamine, bis-ethanolamine, benzylamine, phenethylamine, benzylmethylamine, pyrrolidine, piperidine, azepine, ammonia, potassium hydroxide, sodium methoxide, methylmercaptan, sodium benzylmercaptide, sodium ethylmercaptide, sodium phenylsulfinate, phenethylmercaptan, sodium diethylmalonate, sodium methylsulfinate or sodium ethoxide is employed, there is obtained the corresponding tetrahydro-5H-2-pyrindine.

EXAMPLE 12

1-Methyl-2-oxo-7-(β-hydroxydiethylamino)-1,2,6,7-tetrahydro-5H-[1]-pyrindine

The procedure of Example 6 is repeated except that the starting material is 2-oxo-3-bromo-1-methyl-5,6,7,8-tetrahydro-5H-[1]-pyrindine. Using the same reaction conditions and techniques, there is obtained the product, 1-methyl-2-oxo-7-(β-hydroxydiethylamino)-1,2,6,7-tetrahydro-5H-[1]-pyrindine.

When other nucleophilic reagents in their appropriate solvent are substituted for β-hydroxydiethylamine, the corresponding product is obtained. For example, when methylamine, diethylamine, methylethylamine, methylpropylamine, dipropylamine, ethylpropylamine, ethylamine, propylamine, butylamine, β-hydroxydiethylamine, bis-ethanolamine, benzylamine, phenethylamine, benzylmethylamine, pyrrolidine, piperidine, azepine, ammonia, potassium hydroxide, sodium methoxide, methylmercaptan, sodium benzylmercaptide, sodium ethylmercaptide, sodium phenylsulfinate, phenethylmercaptan, sodium diethylmalonate, sodium methylsulfinate or sodium ethoxide is employed, there is obtained the corresponding tetrahydro-5H-[1]-pyrindine.

EXAMPLE 13

A mixture of 250 parts of 4-dimethylaminomethyl-2[1H]-pyridone and 25 parts of lactose is granulated with suitable water, and to this is added 100 psrts of maize starch. The mass is passed through a 16 mesh screen. The granules are dried at a temperature below 60°C. The dry granules are passed through a 16 mesh screen, and mixed with 3.8 parts of magnesium stearate. They are then compressed into tablets suitable for oral administration.

The 4-dimethylaminomethyl-2[1H]-pyridone used in the foregoing example may be replaced by 25, 100, 250 or 500 parts of other pyridones of this invention to produce tablets suitable for oral administration as an anti-inflammatory, anti-pyretic and/or analgesic according to the method of this invention.

EXAMPLE 14

A mixture of 50 parts of 6-dimethylaminomethyl-2[1H]-pyridone, 3 parts of the calcium salt of lignin sulphonic acid, and 237 parts of water is ball-milled until the size of substantially all of the particles of 6-dimethylaminomethyl-2[1H]-pyridone is less than 10 microns. The suspension is diluted with a solution containing 3 parts of sodium carboxymethylcellulose and 0.9 parts of the butyl ester of p-hydroxybenzoic acid in 300 parts of water. There is thus obtained an aqueous suspension suitable for oral administration for thereapeutic purposes.

EXAMPLE 15

A mixture of 250 parts of 5-methyl-6-[(α-dimethylamino)ethyl]-2[1H]-pyridone, 200 parts of maize starch and 30 parts of alginic acid is mixed with a sufficient quantity of 10 percent aqueous paste of maize starch, and granulated. The granules are dried in a current of warm air and the dry granules are then passed through a 16 mesh screen, mixed with 6 parts of magnesium stearate and compressed into tablet form to obtain tablets suitable for oral administration.

EXAMPLE 16

A mixture of 500 parts of 6-($\alpha$-anilinoethyl)-5-methyl-2[1H]-pyridone, 60 parts maize starch and 20 parts of gum acacia is granulated with a sufficient quantity of water. The mass is passed through a 12 mesh screen and the granules are dried in a current of warm air. The dry granules are passed through a 16 mesh screen, mixed with 5 parts of magnesium stearate and compressed into tablet form suitable for oral administration.

EXAMPLE 17

1. Tablets. —10,000 scored tablets of oral use, each containing 500 mg. of pyridone are prepared from the following ingredients:

|  | Gm. |
|---|---|
| 1-methyl-4-[($\alpha$-dimethylamino)-propyl]-2[1H]-pyridone | 5000 |
| Starch U.S.P. | 350 |
| Talc U.S.P. | 250 |
| Calcium stearate | 35 |

The powdered pyridone is granulated with a 4% w/v aqueous solution of methylcellulose U.S.P. (1500 cps.). To the dried granules is added a mixture of the remainder of the ingredients and the final mixture compressed into tablets of proper weight.

2. Capsules. — 10,000 two-piece hard gelatine capsules for oral use, each containing 250 mg. of pyridone are prepared from the following ingredients:

|  | Gm. |
|---|---|
| 8-($\beta$-hydroxydiethylamino)-5,6,7,8-tetrahydroquinolone | 2500 |
| Lactose U.S.P. | 1000 |
| Starch U.S.P. | 300 |
| Talc U.S.P. | 65 |
| Calcium stearate | 25 |

The powdered tetrahydroquinolone is mixed with the starch-lactose mixture followed by the talc and calcium stearate. The final mixture is then encapsulated in the usual manner. Capsules containing 10, 25, 50 and 100 mg. of the tetrahydroquinolone are also prepared by substituting 100, 250, 500 and 1000 gm. for 2500 gm. in the above formulation.

3. Soft elastic capsules. — One-piece soft elastic capsules for oral use, each containing 200 mg. of pyridone are prepared in the usual manner by first dispersing the powdered active material in sufficient corn oil to render the material capsulatable.

4. Aqueous suspension. — An aqueous suspension for oral use containing in each 5 ml., 1 gram of the pyridone is prepared from the following ingredients:

| 4-hydroxymethyl-2[1H]-pyridone | gm. | 2000 |
|---|---|---|
| Methylparaben U.S.P. | gm. | 7.5 |
| Propylparaben U.S.P. | gm. | 2.5 |
| Saccharin sodium | gm. | 12.5 |
| Glycerin | ml. | 3000 |
| Tragacanth powder | gm. | 10 |
| Orange oil flavor | gm. | 10 |
| F. & D.C. orange dye | gm. | 7.5 |
| Deionized water, q.s. to 10,000 mg. | | |

What is claimed is:

1. A compound of the formula:

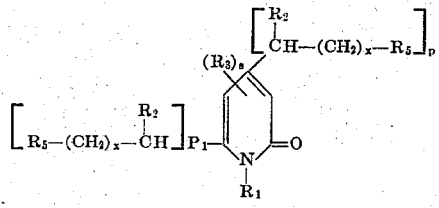

or pharmaceutically acceptable salt thereof, where $R_1$ is hydrogen or methyl, $R_2$ is dialkylamino, wherein the alkyl has from 1 to 4 carbon atoms, $R_3$ is alkyl, of 1–4 carbon atoms, $R_5$ is hydogen; $s$ is 0 or 1; $p$ and $p_1$ are integers equal to 0 or 1 with at least one $p$ equal to 1; and $x$ is an integer ranging from 0–2.

2. The compound of claim 1 wherein $R_1$ is hydrogen; $R_2$ is dimethylamino; $x$ is 0; $s$ is 0; $p$ is 0; and $p_1$ is 1.

3. The compound of claim 1 wherein $R_1$ is hydrogen; $R_2$ is dimethylamino; $x$ is 0; $p$ is 1; $p_1$ is 0 and S is 0.

4. The compound of claim 1 wherein $R_1$ is methyl; $R_2$ is dimethylamino; $p$ is 1; $p_1$ is 0; $s$ is 0; and $x$ is 0.

5. The compound of claim 1 wherein $R_1$ is methyl; $R_2$ is dimethylamino; $p$ is 0; $P_1$ is 1; $s$ is 0; and $x$ is 0.

6. The compound of claim 1 wherein $R_1$ is hydrogen; $R_2$ is dimethylamino; $R_3$ is methyl; $p$ is 0; $p_1$ is 1; $s$ is 1; and $x$ is 2.

7. The compound of claim 1 wherein $R_1$ is hydrogen; $R_2$ is dimethylamino; $R_3$ is methyl; $p$ is 1; $p_1$ is 0; $s$ is 1 and $x$ is 1.

8. The compound of claim 1 wherein $R_1$ is methyl; $R_2$ is dimethylamino; $s$ is 0; $p$ is 0; $p_1$ is 1; and $x$ is 2.

9. The compound of claim 1 wherein $R_1$ is methyl; $R_2$ is dimethylamino; $s$ is 0; $p$ is 1; $p_1$ is 0; and $x$ is 2.

* * * * *